W. G. WOOD.
RESILIENT SUPPORT FOR VEHICLE BODIES.
APPLICATION FILED NOV. 28, 1913.

1,137,176.

Patented Apr. 27, 1915.
2 SHEETS—SHEET 1.

WITNESSES:

INVENTOR,
William G. Wood
BY
ATTORNEY

W. G. WOOD.
RESILIENT SUPPORT FOR VEHICLE BODIES.
APPLICATION FILED NOV. 28, 1913.
1,137,176.
Patented Apr. 27, 1915.
2 SHEETS—SHEET 2.
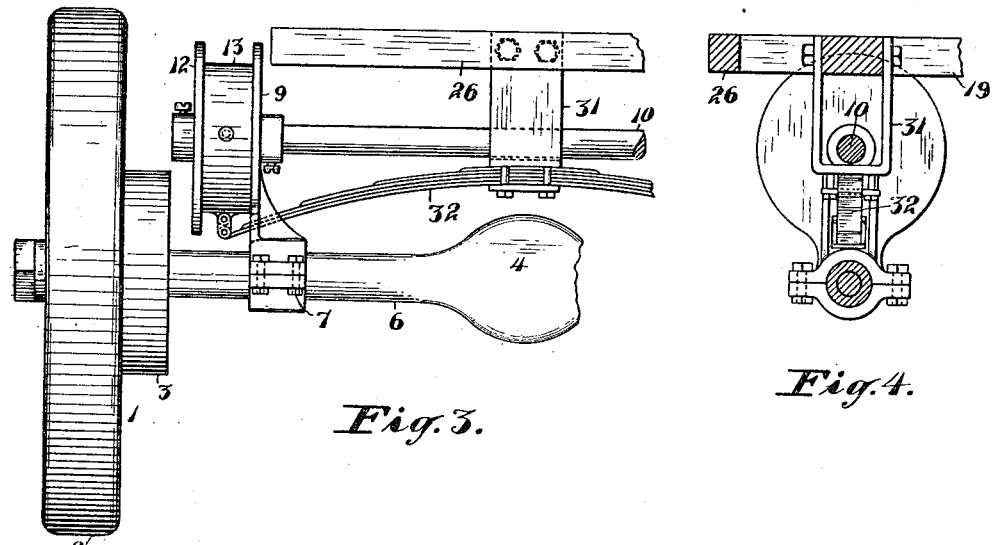
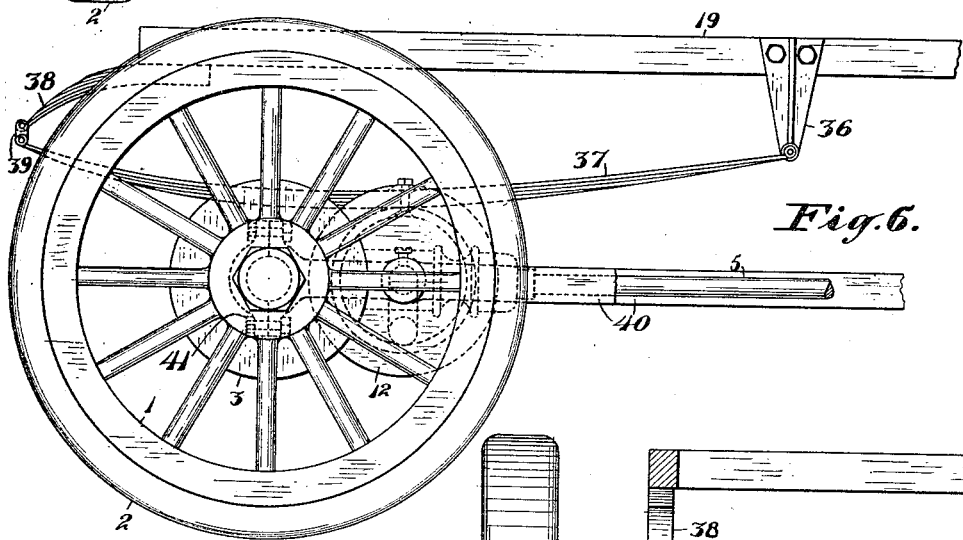
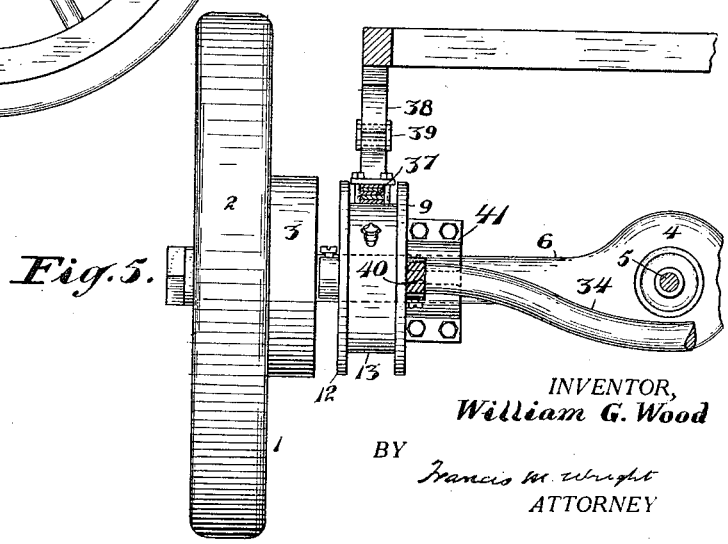
WITNESSES:
INVENTOR,
William G. Wood
BY
ATTORNEY

UNITED STATES PATENT OFFICE.

WILLIAM G. WOOD, OF SACRAMENTO, CALIFORNIA.

RESILIENT SUPPORT FOR VEHICLE-BODIES.

1,137,176.　　　Specification of Letters Patent.　　Patented Apr. 27, 1915.

Application filed November 28, 1913. Serial No. 803,369.

*To all whom it may concern:*

Be it known that I, WILLIAM G. WOOD, a citizen of the United States, residing at Sacramento, in the county of Sacramento and State of California, have invented new and useful Improvements in Resilient Supports for Vehicle-Bodies, of which the following is a specification.

The losses and inconveniences caused by punctures, blow-outs, and other accidents to which pneumatic tires are liable constitute a great objection to the use of automobiles equipped with such tires.

It is the object of my invention to provide means which will support the body of the automobile with a resiliency substantially equal to that of the pneumatic tire without the losses and inconveniences attendant thereon.

Figure 1:
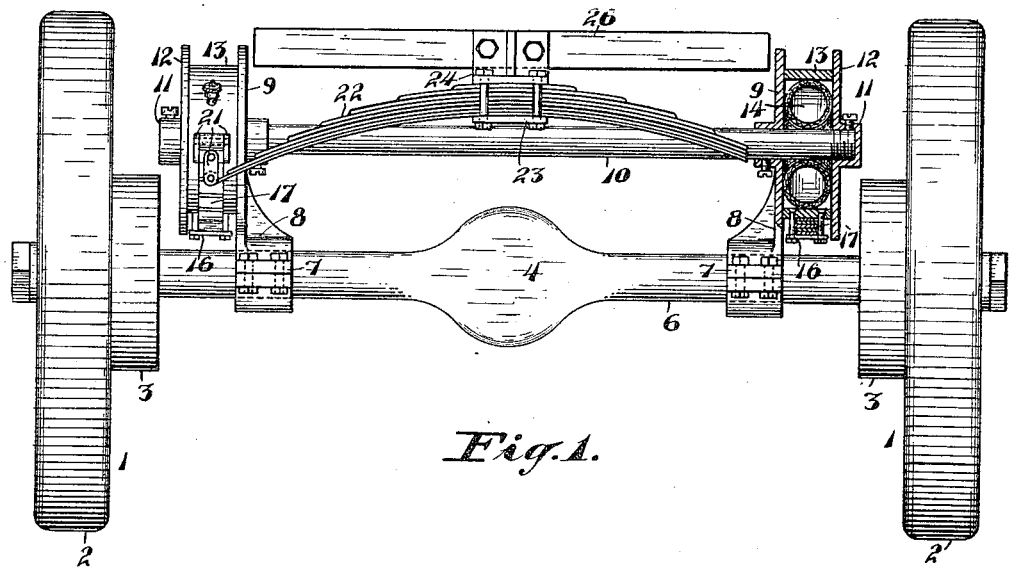
Figure 2:
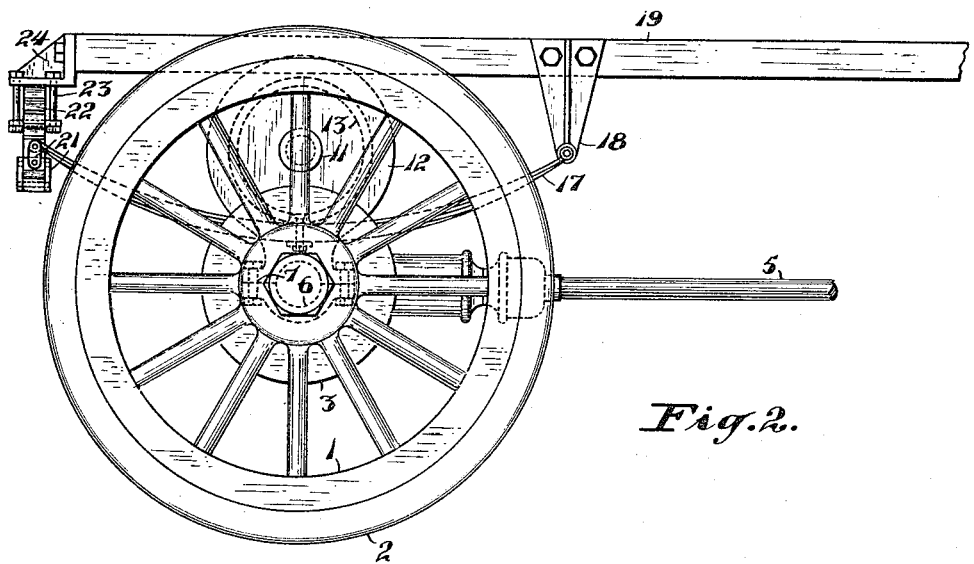

In the accompanying drawing, Figure 1 is a rear view, partly in vertical section, of a portion of an automobile equipped with my invention; Fig. 2 is a side view of the same; Fig. 3 is a broken rear view of a modification of the invention; Fig. 4 is a broken longitudinal section of the same; Fig. 5 is a view similar to Fig. 3 of a further modification; Fig. 6 is a view of the same similar to Fig. 2.

Referring to Figs. 1 and 2 of the drawings, 1 indicates the driving wheels of an automobile having, instead of the usual pneumatic tires, any ordinary tires 2, such as of solid rubber. 3 indicates the brake drums, 4 the differential casing, and 5 the driving shaft. Upon the tubes 6 inclosing the driving axles are clamped, as shown at 7, depending extensions 8 from inner plates or disks 9, through registering holes in which extends a horizontal cylindrical bar 10 upon the threaded outer ends of which are screwed caps 11 extending from the centers of outer plates 12, said outer and inner plates having between them rings 13, within which rings, and around the terminal portions of the cylindrical bar 10, are annular pneumatic tubes 14. To the lower portions of said rings 13 are bolted, as shown at 16, the central portions of side carriage spring 17, the front ends of which are secured to the lower ends of hangers 18 depending from the main frame 19 of the automobile. The rear ends of said spring 17 are pivotally connected to the upper portions of short links 21, the lower ends of which links are pivotally connected to the ends of a cross carriage spring 22, the central portion of which is connected, as shown at 23, to a hanger 24, depending from a rear member 26 of the main frame 19 of the automobile. It will be seen that, with this construction, the weight of the rear of the automobile is transmitted from the springs 22, 17, to the cylindrical bar 10, and thence to the disks 9 and tubes 6 through the inflated annular pneumatic tubes 14. Thus the same resilient effect is produced as with the ordinary pneumatic tire, without the danger of punctures or blow-outs.

In the modification of the invention shown in Figs. 3 and 4, the side carriage springs are dispensed with, and the main frame of the automobile is supported upon a yoke 31 extending around the cylindrical bar 10, which yoke is supported upon the middle of a cross carriage spring 32, the ends of which are suspended from the lowermost points of the rings 13.

In the modification shown in Figs. 5 and 6, the rings 13, instead of being above the driving axles, are in front of them, being secured to a supplementary frame 40, the rear end 41 of which is supported on the driving axle, and, in consequence, instead of a straight cylindrical rod 10 being used, I now employ a rod 34 depressed in the center to permit the driving shaft to pass over the same to the differential gearing. The main frame 19 is supported, partly by means of a hanger 36 upon the front ends of side carriage springs 37, and partly upon the front portions of short springs 38, the rear ends of which springs 38 are connected to links 39 connected to the rear end of said side carriage springs 37, said side carriage springs being secured to the upper portions of the rings 13.

The modes of operation of the forms of the invention shown in Figs. 3, 4, 5 and 6 will readily be understood from that given in the form shown in Figs. 1 and 2.

It is of the essence of my invention that there should be at each side of the vehicle an annular pneumatic tube, a ring around the tube, and a bar extending through the tube, said ring, tube and bar being normally coaxial. Also that there should be parallel plates secured to the bar on opposite sides of the ring and in slidable contact therewith. Also that the vehicle body should be supported on one of the two elements, the ring and the bar, and that the other element should be supported upon the wheel axle. But it is immaterial whether, as here shown, the bar is supported upon the axle while the ring supports the vehicle wheel, or the converse is the case. Nor is it of the essence of the invention that, as here shown, the same bar should extend entirely across the vehicle through the center of both rings. The form of the invention preferred is that the bar should be parallel with, and spaced from, the axle, as this construction enables the tubes to be easily removed and replaced, which could not be done if the tube encircled the axle.

I claim:—

1. Resilient means for supporting a vehicle body upon wheels comprising, at each side of the vehicle, a ring, and a bar passing through the ring, one of said elements being supported by the wheels and the other supporting the vehicle body, an annular pneumatic tube within the ring and around the bar and coaxial therewith, and plates secured to the bar on opposite sides of the ring, and in slidable contact therewith.

2. Resilient means for supporting a vehicle body upon wheels comprising, at each side of the vehicle, a ring, and a bar passing through the ring parallel with, and spaced from the wheel axle, one of said elements being supported by the wheels and the other supporting the vehicle body, an annular pneumatic tube within the ring and around the bar and coaxial therewith, and plates secured to the bar on opposite sides of the ring, and in slidable contact therewith.

In testimony whereof I have hereunto set my hand in the presence of two subscribing witnesses.

WILLIAM G. WOOD.

Witnesses:
J. E. HUNTOON,
S. E. POPE.

Copies of this patent may be obtained for five cents each, by addressing the "Commissioner of Patents, Washington, D. C."